United States Patent [19]

Rabenau et al.

[11] Patent Number: 4,925,464
[45] Date of Patent: May 15, 1990

[54] FLUID FLOW SWITCHING VALVE ASSEMBLY AND SYSTEM

[75] Inventors: Richard Rabenau, Arab; Rowland W. Kanner; Donald W. Hunter, both of Guntersville, all of Ala.

[73] Assignee: Ryder International Corporation, Arab, Ala.

[21] Appl. No.: 272,626

[22] Filed: Nov. 17, 1988

[51] Int. Cl.⁵ .............................................. B01D 53/04
[52] U.S. Cl. ................................ 55/179; 137/625.31; 137/625.29; 55/162; 55/389
[58] Field of Search ................... 55/75, 160, 162, 179, 55/389, 62, 382; 137/625.29, 625.31

[56] References Cited

U.S. PATENT DOCUMENTS

| | | | |
|---|---|---|---|
| 3,487,608 | 1/1970 | Graff | 55/179 X |
| 3,831,621 | 8/1974 | Anthony et al. | 137/625.31 X |
| 3,990,447 | 10/1976 | Vega | 128/234 |
| 4,082,095 | 4/1978 | Mendelson et al. | 128/235 |
| 4,115,276 | 9/1978 | Kelly | 137/625.29 X |
| 4,272,265 | 6/1981 | Snyder | 55/389 |

FOREIGN PATENT DOCUMENTS

| | | | |
|---|---|---|---|
| 0140760 | 4/1951 | Australia | 137/625.29 |
| 2300639 | 7/1974 | Fed. Rep. of Germany | 137/625.31 |

OTHER PUBLICATIONS

Nidek Medical–Mark 5 Concentrator.
Oxycon SF–430 Oxygen Concentrator–Smith & Davis.
Puritan–Bennett Companion 420 Oxygen Concentrator.

Primary Examiner—Charles Hart
Attorney, Agent, or Firm—R. A. Giangiorgi

[57] ABSTRACT

A valve assembly and overall system provides selective fluid flow switching and communication between a plurality of flow conduits. The valve assembly includes two valve members which have respectively engaged surfaces which are relatively rotatable to provide the valving action. A first valve member has a plurality of through apertures for respective communication with the flow conduits and a second valve member includes flow passage means for selectively interconnecting at least two of the apertures through the first valve member in order to enable fluid flow therebetween. Drive means is provided for driving continuous relative rotation of the valve members in order to enable rotationally cycled interconnection and fluid flow through the interconnected apertures. The valve assembly can be employed, for example, to provide switching of air intake between dual air separation vessels which provide concentrated oxygen, so that air can be processed in one of the vessels while the other processing vessel is regenerated to purge the waste gases for further oxygen separtaion, and modulated flow switching is performed in a continuous, cycled manner with simple and reliable cycle frequency.

18 Claims, 4 Drawing Sheets

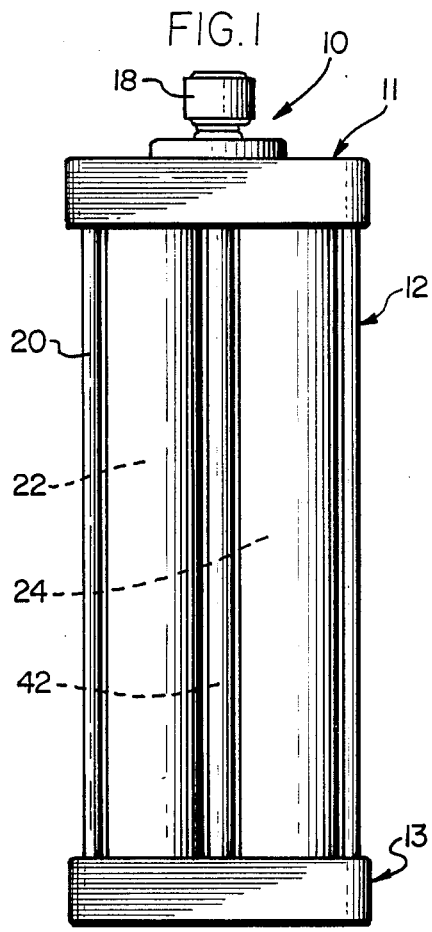
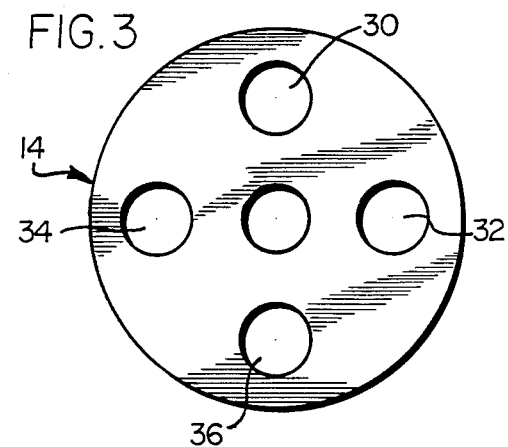
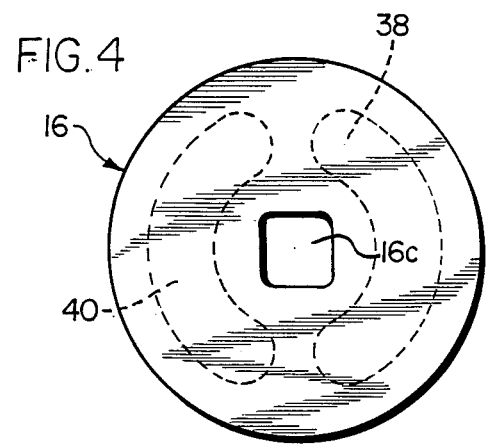
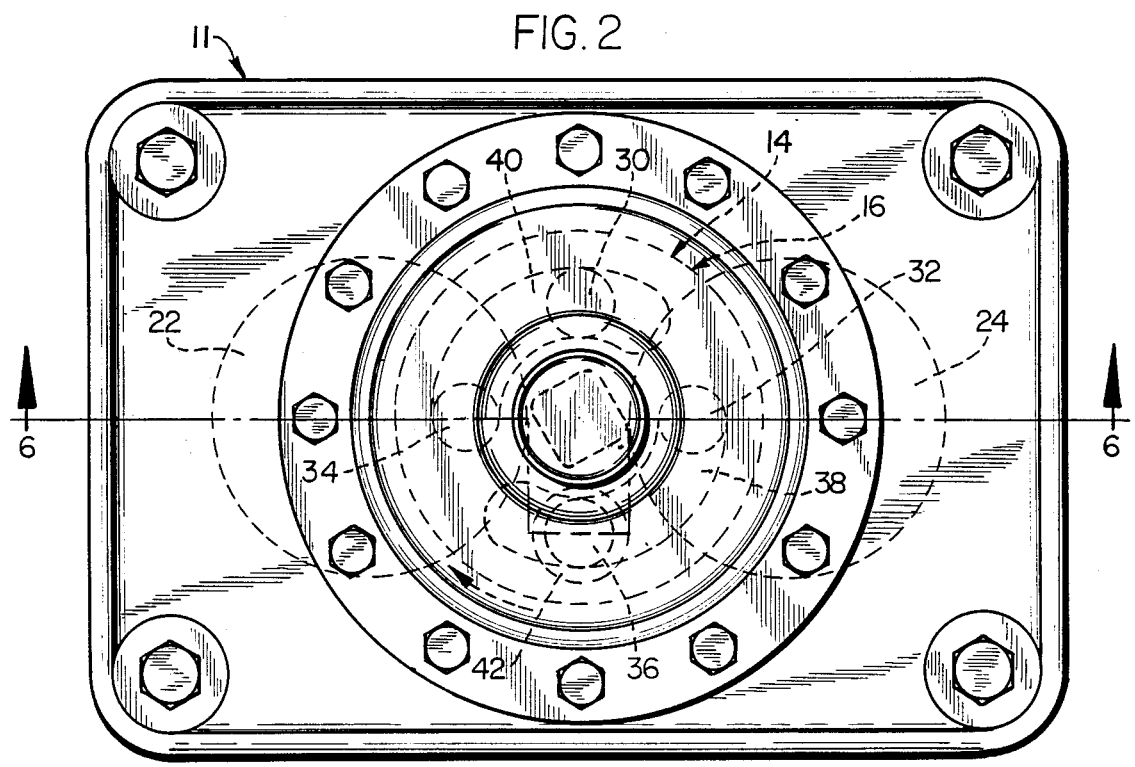

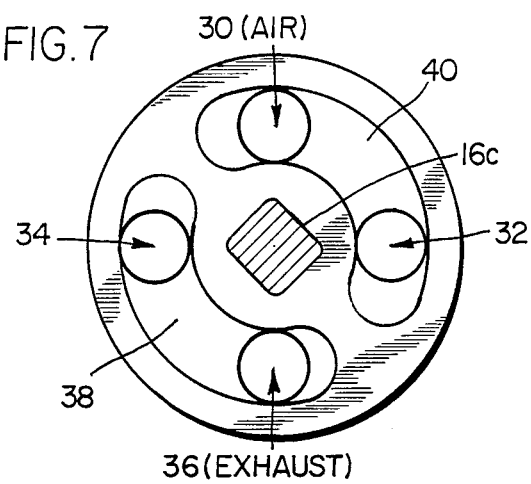
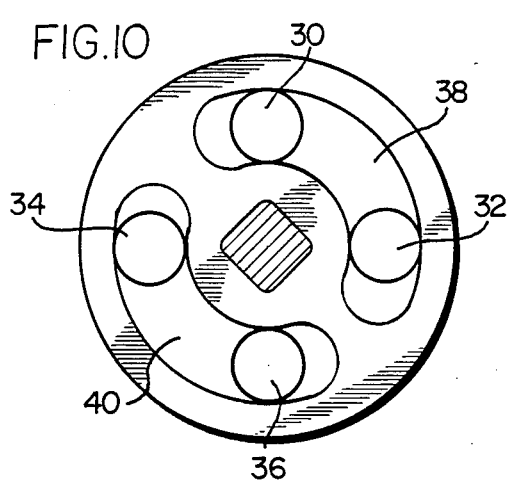
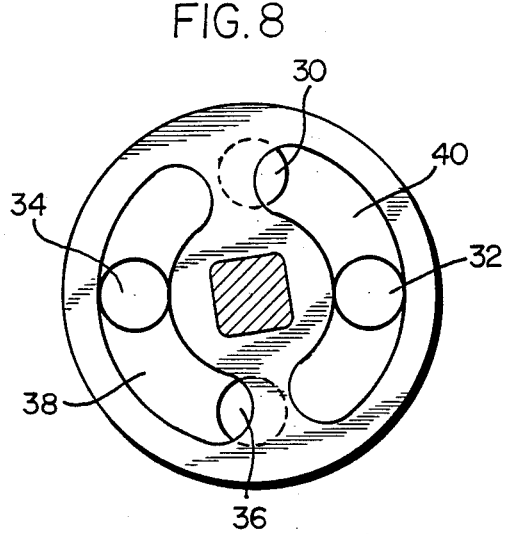
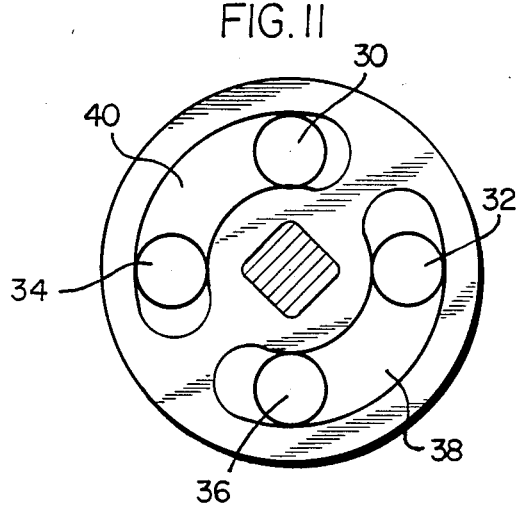
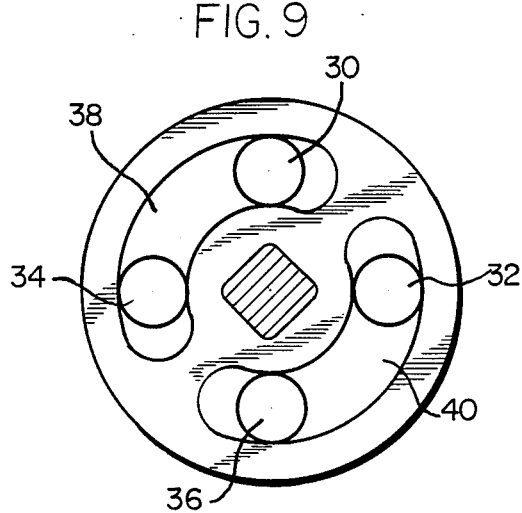
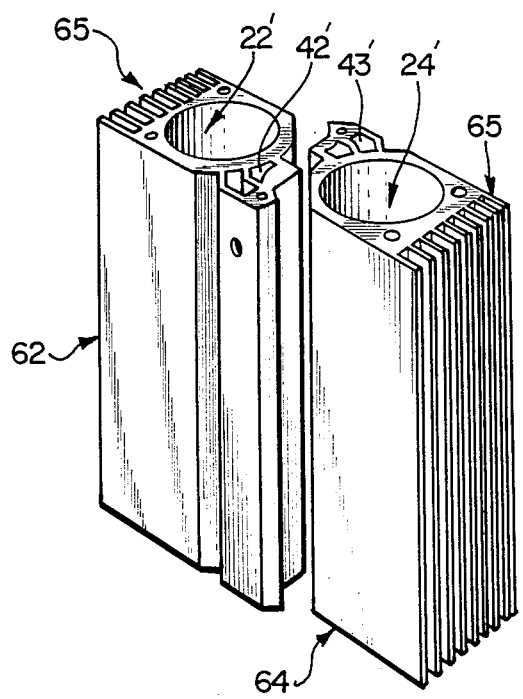

FLUID FLOW SWITCHING VALVE ASSEMBLY AND SYSTEM

BACKGROUND OF THE INVENTION

This invention relates to flow control apparatus for providing switching of fluid flow among multiple flow conduits, and more particularly relates to valve control devices for selective fluid flow switching.

Valve systems which have been developed for providing cycled switching between multiple fluid processing units such as dual molecular sieve beds for oxygen separation from air, have employed solenoid or electropneumatic operated valves with electronic circuits for timing of the cycled valve action. For example, in conventional medical oxygen concentrator systems, (such as the portable oxygen concentrator devices commercially produced by Puritan-Bennett Corporation and Smith & Davis Company) multiple solenoid valves switch compressed air flow back and forth between the two oxygen separating sieve beds so that one bed is separating oxygen from the air while the other bed is being purged of the nitrogen, carbon dioxide and water vapor adsorbed on the molecular sieve material in order to regenerate the sieve material for further oxygen separation. The solenoid-operated valves not only require electronic circuitry for controlling the cycled valve action, but in addition, the instant open and close action of the solenoid operated spindle valves create substantial shock and noise caused by sudden acceleration and deceleration of the valve spindles, and the handling of air and air component flow, as well as channeling and abrasion of the sieve bed particles by the resulting pneumatic impacts.

These disadvantages are eliminated in the valve and fluid flow switching system in accordance with the present invention.

THE SUMMARY OF THE INVENTION

In accordance with the present invention a valve assembly and overall system are provided wherein the valve assembly attains selective fluid flow switching and communication between a plurality of flow conduits. The valve assembly includes two valve members which have respectively engaged surfaces which are relatively rotatable to provide the valving action. A first valve member has a plurality of through apertures for respective communication with the flow conduits and a second valve member includes flow passage means for selectively interconnecting at least two of the apertures through the first valve member in order to enable fluid flow therebetween. Drive means is provided for driving continuous relative rotation of the valve members in order to enable rotationally cycled interconnection and fluid flow through the interconnected apertures.

In a preferred embodiment, both of the valve members are fabricated as ceramic disks with the respective engaged surfaces being ground and polished to enable negligible rotational friction and fluid-tight sealing between the engaged surfaces. The apertured valve disk is maintained stationary with respective to the continuous rotation of the second valve disk by means of a synchronous motor such as a 60 cycle AC motor with gear reduction which thereby provides the timing control for uniform rotational speed and the resulting cycled interconnection and fluid flow through the apertures of the first valve disk.

The valve assembly can be employed, for example, to provide switching of air intake between dual air separation vessels which provide concentrated oxygen, so that air can be processed in one of the vessels while the other processing vessel is regenerated to purge the waste gases for further oxygen separation, and the flow switching is performed in a continuous, cycled manner with simple and reliable cycle frequency. When employed for such dual flow switching, the first valve member includes an annular arrangement, for example, of four through apertures equally spaced in locations generally separated at 90° between adjacent apertures, and the second rotating valve disk includes a pair of blind, arcuate slots opening only through the surface engaging the apertured valve disk. The arcuate slots are arranged in annular opposition and are dimensioned so that each slot interconnects only an adjacent pair of the annularly arranged apertures. The continuous rotation of the slotted valve disk enables each 90° rotation to separately interconnect sequentially differing adjacent aperture pairs by alignment with the respective slots. The dual air separation vessels are connected to two of the diametrically opposed valve disk apertures so that the slotted valve disk alternatively interconnects each of the air separation vessels with intake air and a waste gas exhaust vessel respectively coupled to the other two valve disk apertures, so that the flow switching by the valve assembly allows one of the processing vessels to separate air while the other processing vessel is purged of waste gas in a continuously cycled manner. The continuous rotation of the slotted valve disk also provides rotationally gradual alignment and successive partial misalignment of the adjacent aperture pairs with the respective slots which are also tapered in order to enable smooth transition between each successive aperture pair interconnection and produces smooth modulation of the fluid flows with elimination of flow shocks and the noise generally associated therewith.

BRIEF DESCRIPTION OF THE DRAWINGS

FIG. 1 is a front elevational view of an abutment of the valve structure of the invention which is installed on an instrument for separation of oxygen from air;

FIG. 2 is a top plan view of the valve structure in FIG. 1 with the drive motor removed to illustrate the location of the valve structure in relation to the air processing vessels of the instrument;

FIG. 3 is a plan view of one of the valve disks of the valve structure in FIG. 2 illustrating the location of fluid flow apertures therethrough;

FIG. 4 is a plan view of the second valve disk of the valve structure in FIG. 2 illustrating a pair of slots for interconnecting adjacent apertures in the first valve disk of FIG. 3;

FIGS. 7-11 are plan views of the relatively rotatable valve disks shown in FIGS. 2-4 and illustrating multiple rotational alignments of the two valve members in sequenced positions corresponding to cycled interconnections of the adjacent flow apertures of the first valve disk by the rotating slots in the second valve disk; and FIG. 12 is a perspective view of a pair of finned extrusions providing cavities for the processing and fluid flow through the instrument shown in FIGS. 1 and 6.

DESCRIPTION OF THE ILLUSTRATED EMBODIMENTS

Figure 5:
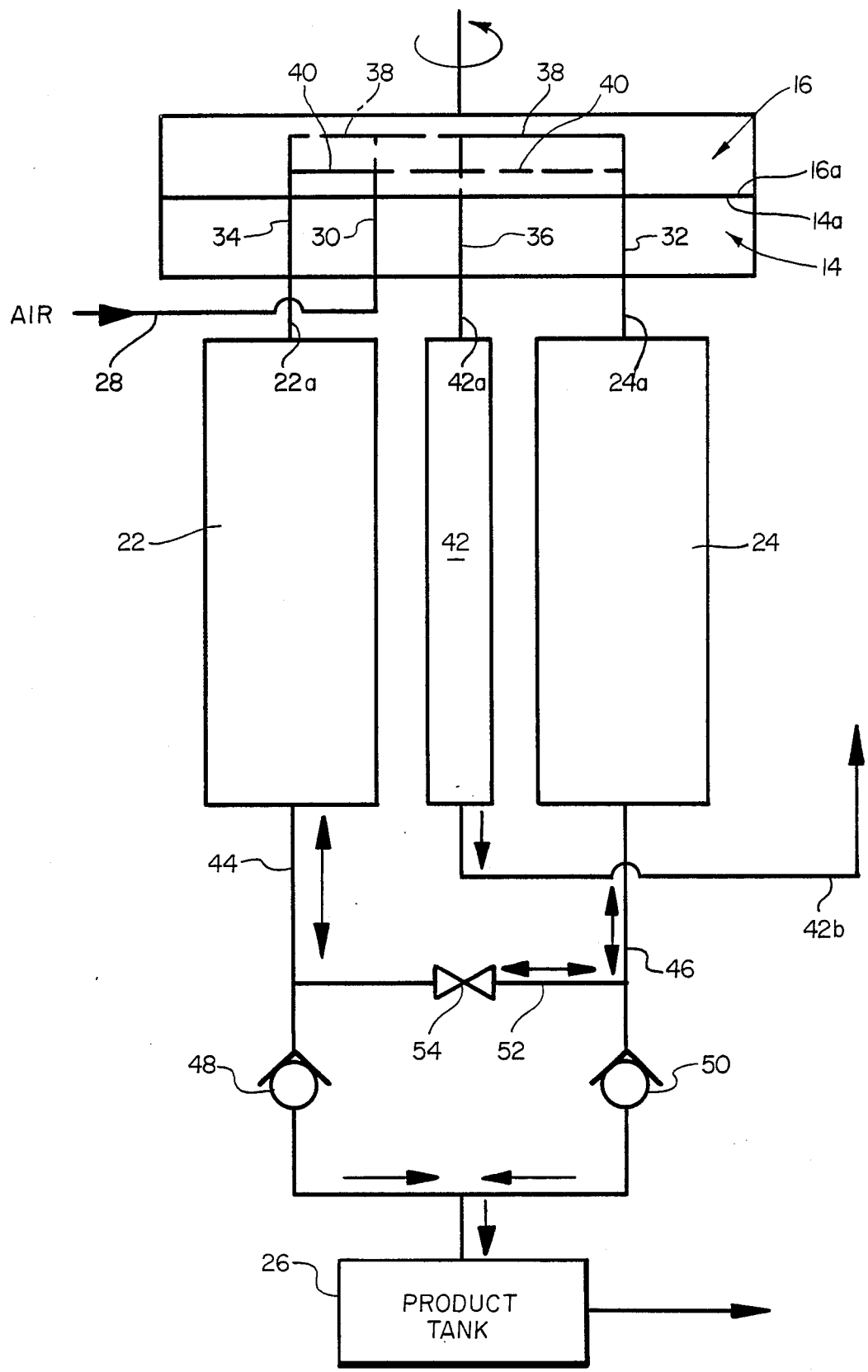
FIG. 5 is a schematic diagram showing the arrangement of fluid flow through the instrument shown in FIGS. 1 and 6.

Referring to FIG. 1, an embodiment of the valve assembly in accordance with the present invention generally designated by reference character 10 is shown installed on an instrument for separation of oxygen from air generally designated by reference character 12. The valve assembly 10 includes a stationary valve disk 14 shown in FIG. 3 which engages a rotating valve disk 16 shown in FIG. 4 which is rotationally driven by a synchronous motor 18 having an internal gear reduction system, as more fully described hereinafter.

The valve disks 14 and 16 are housed within an end cap generally designated by reference character 11 which is secured on the upper end of a vertically oriented vessel housing 20. The housing 20 encloses a pair of vertically oriented cavities 22 and 24 which are each filled with a bed of conventional, zeolitic molecular sieve particles which adsorb nitrogen, carbon dioxide and water vapor from pressurized air so that the separated oxygen passes alternatively through the beds and is accumulated in product tank 26 as shown in the schematic flow diagram illustrated in FIG. 5.

Figure 6:
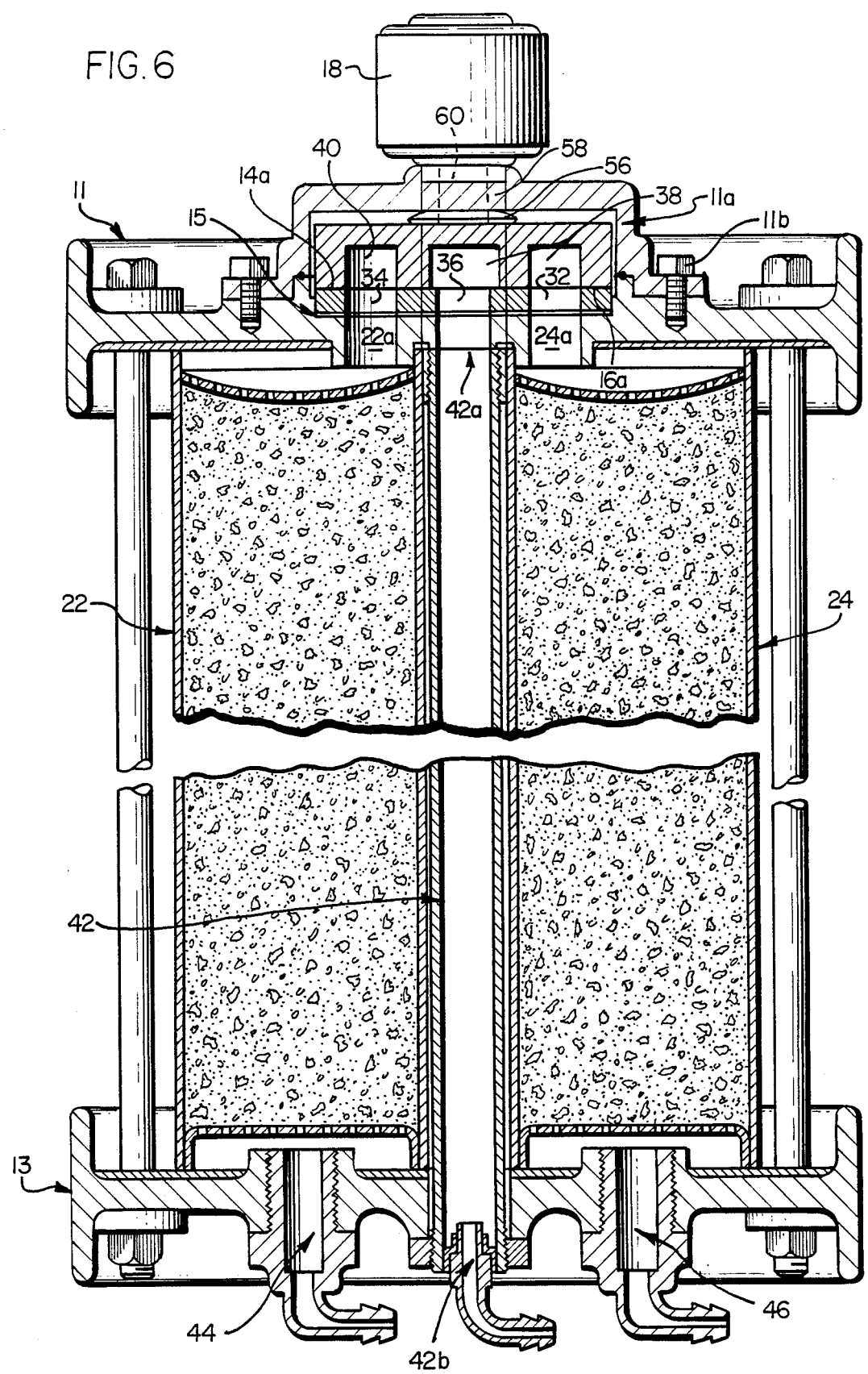
FIG. 6 is a vertical sectional view of the instrument in FIG. 1, taken along line 6—6 in FIG. 2 and viewed in the indicated direction.

Referring particularly to the rotational position of valve disks 14 and 16 shown in FIGS. 2, 5, 6, and 11 in the arrangement of the illustrated instrument 12, compressed air which has been filtered and cooled flows through a delivery line 28 into the air aperture 30 formed in the stationary valve disk 14 which are also shown in FIG. 3. From the aperture 30 the air is directed alternatively to one of the two sieve bed cavities 22 or 24 by the alternative interconnection of the aperture 30 with one of the respective apertures 32 and 34 also shown in FIG. 3. The alternative interconnection of the air aperture 30 with either aperture 32 or 34 is provided by one of a pair of blind, arcuate slots 38 and 40 formed in rotating valve disk 16. As best shown in FIG. 6, the rotating valve disk 16 is axially dimensioned with sufficient thickness to enable the two blind slots 38 and 40 to open only through the lower surface 16a which engages the upper surface 14a of the stationary valve disk 14. For example, referring to FIG. 11, when the rotational position of the disk 16 superimposes alignment of slot 40 to interconnect the air aperture 30 with the adjacent aperture 34 which communicates with the sieve bed 22 so that the pressurized air is delivered for oxygen separation in the bed 22, at the same time, the arcuate slot 38 interconnects the aperture 32 leading to bed 24 with the adjacent aperture 36 connected to the narrow exhaust or waste gas vessel 42. In the illustrated embodiment of the alternative valve interconnections, the intake air and waste gas vessel are connected to diametrically opposed valve disk apertures as shown at 30 and 36. Suitably modified embodiments of the two valve disks can employ variable numbers and arrangements of the flow apertures and passage slots.

Referring again to FIG. 5, the discharge conduits 44 and 46 from the respective bed vessels 22 and 24 both lead to the oxygen product tank 26 with respective check valves 48 and 50 so that the bed vessels 22 and 24 can alternatively deliver separated oxygen to the product tank 42. The discharge conduits 44, 46 and 42b can be installed as part of a bottom end cap 13 as shown in FIG. 6. In addition, the discharge conduits 44 and 46 are connected by a bridge circuit 52 with a purge orifice 54 in order to enable a small portion of the product oxygen stream from either of the bed vessels 22 and 24 to provide a lower pressure backflow of oxygen through the respective discharge conduit in order to regenerate the sieve bed in the other bed vessel; the backflow of pure oxygen lowers the pressure in the regenerating bed vessel which causes the molecular sieve material to release the adsorbed nitrogen, carbon dioxide, and water vapor which are then purged through the respective intake line 22a or 24a connected to respective valve disk apertures 34 and 32. Thus, in the rotational position of the valve disks 14 and 16 shown in FIGS. 2, 5, 6 and 11, the purged gasses from the bed vessel 24 are delivered by slot 38 interconnecting the valve disk apertures 32 and 36 into the exhaust vessel intake line 42a and are thereafter muffled in the exhaust vessel 42 and discharged to the atmosphere from the discharge line 42b.

Referring again to FIG. 6, the valve disks 14 and 16 are preferably cast from ceramic material, for example, high purity alumina, which can be ground to a highly polished finish enabling the flatness of the engaged surfaces 14a and 16a sufficiently conforming so that a fluid-tight seal is maintained between the surfaces even while they are relatively rotated during valve operation. The highly polished finish of the engaged surfaces prevents excessive rotational resistance and frictional forces during the valve operation. The fluid-tight seal between the engaged valve disk surfaces is maintained by the compressive force of a spring washer 56 which bears upon the upper surface of the rotating valve disk 16 and an annular thrust bearing 58 secured within the housing cap 11a which is bolted (11b) to the end cap 11. The synchronous motor 18 through its internal gear reduction mechanism drives a shaft 60 which passes through the annular thrust bearing 58 and washer 56 and terminates in a square drive end (not shown) which fits within the square aperture 16c of the rotating valve disk 16. The valve disk 16 is continually rotated at a slow speed generally governed by the approximate length of time required for saturation of one of the molecular sieve beds 22 and 24 with the adsorbed nitrogen, carbon dioxide and water vapor separated from the input air.

In the illustrated embodiment, the rotating valve disk 16 has two arcuate, interconnection slots 38 and 40 which are arranged in annular opposition, and the four through apertures 30, 32, 34 and 36 in the stationary valve disk 14 are arranged in an annular pattern and equally spaced in locations generally separated at 90° between adjacent apertures as shown in FIGS. 3 and 4. The valve disk 14 is seated on a gasket 15 which is correspondingly apertured. In the valving operation, referring to FIGS. 7–11, the continuous slow rotation of the valve disk 16 by the appropriate gearing of the synchronous motor 18 results in successive interconnection of the four valve disk apertures in two adjacent pairs by the respective slots 38 and 40 such that the two paired interconnections are changed at approximately each 90° rotation of the valve disk 16 and slots 38,40. For example, as explained with reference to the rotational position of the valve disks shown in FIG. 11, the slot 40 interconnects the air aperture 30 with the aperture 34 and bed vessel 22 for oxygen separation therein, while slot 38 simultaneously interconnects the aperture 32 and bed vessel 24 to the aperture 36 and exhaust vessel 42 so that a portion of the oxygen produced by bed 22 is directed to backflow and purge the adsorbed waste gasses from the bed 24 through the slot 38 into the waste vessel 42. Thereafter, 90° rotation of the valve disk 16 into the position illustrated in FIG. 7 rotates the slots 38 and 40 so that the air aperture 30 is now interconnected by the slot 40 to the aperture 32 and bed vessel 24 which discharges oxygen. The discharged oxygen is partially diverted by the bridge conduit 52 for backflow and purge of the bed vessel 22 from which the waste gasses flow into the waste vessel 42 by interconnection of the aperture 34 with the exhaust or waste aperture 36 by the slot 38.

The succeeding 90° rotation of the valve disk 16 rotates the slots through the intermediate position (of approximately 45° rotation) shown in FIG. 8 into the position shown in FIG. 9 in which the air intake is again directed into the vessel 24 through the slot 40, and the vessel 22 is purged into the waste vessel 42 by interconnection of the slot 38. As a result of the aperture and slot configurations of the illustrated valve disks 14 and 16, each of the bed vessels 22 and 24 is alternatively connected to the air intake or the waste vessel 42 with each successive 90° rotation, and therefore every 180° rotation of the disk 16 connects the same bed to the air intake by the interconnection of alternate slots 38 and 40. Consequently, a full 360° rotation of the valve disk 16 produces two processing cycles for each bed so that each bed performs the air separation operation twice and is purged twice in alternating sequence.

The fluid-tight seal which is maintained during the relative rotation of the valve disks 14 and 16 prevents any cross-contamination of the different gaseous streams flowing sequentially through the slots 38 and 40 and apertures 32 and 34.

The slow continuous rotation of the valve disk 16, for example, at approximately 2 RPM, provides simple and reliable timing control of the cycled oxygen separation and purge operations of each bed 22,24 without the complexity of additional electronic timing. In addition, the slow continuous rotation of the valve disk 16 and slots 38,40 produces gradual rotational alignment and successive partial misalignment (FIG. 8) of the slots with adjacent aperture pairs in order enable smooth transition of the valving interconnection of the sequential aperture pairs, so that quiet valve operation is attained and mechanical wear in the sieve beds as well the valving and flow conduit junctions is supressed. Moreover, the respective rounded or tapered entrance ends 38a, 40a of the passage slots promotes the gradual and smooth valving action.

Referring to FIG. 12, in order to simplify the fabrication and assembly of an oxygen separating instrument or similar multiple vessel device, a plurality of generally elongate cavities can be fabricated in unitary, plastic extrusions as shown at 62 and 64 which also include heat exchange fins 65. For example, each of the two molecular sieve bed cavities $22^1$ and $24^1$ can be fabricated as the larger cavity in each of the two respective identical extrusions 62 and 64 which can also include smaller cavities $42^1$ and $43^1$ for employment as a waste gas vessel or to serve as a wiring bus conduit for the wiring of the drive motor and other circuits for monitoring pressure and operation of the instrument.

In light of the foregoing description of the embodied valve assembly and flow switching system, it will be evident to those skilled in the design of such systems that various aspects may be modified without departing from the invention. As such, the scope of the invention is not limited by the particular embodiment illustrated and described herein and is defined by the appended claims and equivalents thereof.

The invention is claimed as follows:

1. A valve assembly for providing selective flow communication between a plurality of fluid flow conduits, comprising: two valve members having respective engaged surfaces relatively rotatable to provide valving action, said valve members including a first valve member having a plurality of through apertures for respective communication with said flow conduits, and a second valve member including flow passage means for selectively interconnecting at least two of said apertures through said first valve member in order to enable fluid flow therebetween; and drive means for driving continuous relative rotation of said valve members in order to enable rotationally cycled interconnection and fluid flow through said two apertures.

2. A valve assembly according to claim 1 wherein said flow passage means comprises a blind slot opening only through said surface engaging said first valve member.

3. A valve assembly according to claim 1 wherein said through apertures of said first valve member are located in spaced, annular arrangement, and wherein said flow passage means provides said interconnection between only an adjacent pair of said annularly arranged apertures.

4. The valve assembly according to claim 3 wherein said annular arrangement includes four of said through apertures equally spaced in locations generally separated at 90° between said adjacent apertures, and wherein said second valve member includes said flow passage means comprising a pair of blind, arcuate slots opening only through said surface engaging said first valve member, said arcuate slots being arranged in annular opposition such that each full 90° relative rotation of said valve members separately interconnects successively differing adjacent pairs of said apertures in alignment with a respective one of said slots.

5. A valve assembly according to claim 4 wherein said slots are dimensioned such that said continuous relative rotation of said valve members provides rotationally gradual allignment and successive partial misalignment of said adjacent aperture pairs with said respective slots in order to enable smooth transition between each said successive aperture pair interconnection.

6. A valve assembly according to claim 5 in combination with a pair of fluid processing vessels connected in fluid communication with a respective first pair of said through apertures located in diametrical opposition in said annular aperture arrangement such that cycled 180° relative rotation of said valve members enables cycled, alternative interconnection of said vessel with a respectively different one of said passage slots.

7. A valve assembly according to claim 5 wherein a second pair of said through apertures is located in diametrical opposition perpendicular to the diametrical opposition of said first pair of through apertures, and wherein one of said second paired apertures is connected to a source of fluid for processing in said vessels and the other of said second paired apertures is connected to a waste vessel for receiving backflow of waste fluid from said processing vessels.

8. A valve assembly according to claim 7 wherein each of said processing vessels includes an intake conduit respectively connected to one of said first pair of through apertures, each said processing vessel further including a respective discharge conduit for processed effluent therefrom, said discharge conduits being interconnected for flowing a portion of processed effluent from one of said processing vessels into said discharge conduit of the other of said processing vessels for backflow therethrough, in order to direct said backflow through said respective intake conduit and respectively connected through aperture into said waste vessel interconnected by one of said passage slots, whereby one of said processing vessels processes said fluid intake while the other of said processing vessels simultaneously receives and purges backflow, in cycled manner alternating with said continuously alternating aperture interconnection by said passage slots.

9. A valve assembly according to claim 1 wherein said drive means comprises an electrical motor operating at synchronous speed and coupled to drive uniform relative rotational speed of said valve members and uniform cycle frequency of said aperture interconnection and fluid flow therethrough.

10. A valve assembly according to claim 9 wherein said motor is coupled to drive rotation of said second valve member relative to said first, apertured valve member maintained in stationary relationship thereto.

11. A valved system for providing selective fluid flow communication between a plurality of fluid processing vessels, comprising: two valve members having respective engaged surfaces relatively rotatable to provide valving action, said valve members including a first valve member having a plurality of through apertures for respective communication with said vessels, and a second valve member including a pair of separate flow passage means for selectively and separately interconnecting first and second variably paired combinations of said apertures through said first valve member in order to enable separate fluid flow between each said aperture pair; drive means for driving continuous relative rotation of said valve members in order to enable rotationally cycled, variable interconnection and fluid flow through said aperture pairs; a pair of fluid processing vessels having respective intake conduits respectively connected to one of said through apertures; a source of fluid for processing in said vessels and a waste vessel for receiving backflow of waste fluid from said processing vessels, said fluid source and said waste vessel being separately connected to respective ones of said through apertures different from the apertures connected to said processing vessels, each said processing vessel further including a respective discharge conduit for processed effluent therefrom, said discharge conduits being interconnected for flowing a portion of processed effluent from one of said processing vessels into said discharge conduit of the other of said processing vessels for backflow therethrough, in order to direct said backflow through said respective intake conduit and respectively connected aperture into said waste vessel interconnected by one of said flow passage means, whereby one of said processing vessels processes said fluid from said respectively connected intake conduit while the other of said processing vessels simultaneously receives and purges backflow in cycled manner alternating with said continuously alternating aperture interconnection by said respective flow passage means.

12. A valved system according to claim 11 wherein said through apertures of said first valve member are located in spaced, annular arrangement including four of said apertures equally spaced in locations generally separated at 90° between said adjacent apertures, and wherein said separate flow passage means in said second valve member comprises a pair of blind, arcuate slots opening only through said surface engaging said first valve member, said arcuate slots being arranged in annular opposition such that each full 90° relative rotation of said valve members separately interconnects successively differing adjacent pairs of said apertures in separate alignment with a respective one of said slots.

13. A valved system according to claim 12 wherein said apertures connected to said processing vessels are located in diametrical opposition in said annular aperture arrangement such that cycled 180° relative rotation of said valve members enables cycled, alternative interconnection of said vessels with a respectively different one of said passage slots.

14. A valved system according to claim 12 wherein said slots are dimensioned such that said continuous relative rotation of said valve members provides rotationally gradual alignment and successive partial misalignment of said adjacent aperture pairs with said respective slots in order to enable smooth transition between each said successive aperture interconnection and modulation of the fluid flow therethrough.

15. A valved system according to claim 11 wherein said drive means comprises an electrical motor operating at synchronous speed and coupled to drive uniform relative rotational speed of said valve members and uniform cycle frequency of said aperture interconnection and fluid flow therethrough.

16. A valve assembly for providing selective flow communication between a plurality of fluid flow conduits, comprising: two valve members having respective engaged surfaces relatively rotatable to provide valving action, said valve members including a first valve member having a plurality of through apertures for respective communication with said flow conduits, and a second valve member including flow passage means for selectively interconnecting at least two of said apertures through said first valve member in order to enable fluid flow therebetween; and drive means for driving continuous relative rotation of said valve members in order to enable rotationally cycled interconnection and fluid flow through said two apertures, wherein said flow passage means is dimensioned such that said continuous relative rotation of said valve members provides rotationally gradual alignment and successive partial misalignment of said apertures with said flow passage means in order to enable smooth transition between each said successive interconnection and modulated flow therethrough.

17. The valve assembly according to claim 16 wherein said flow passage means comprises a tapered slot promoting said smooth transition and modulated flow.

18. A valved system for providing selective fluid flow communication between a plurality of fluid processing vessels, comprising: two valve members having respective engaged surfaces relatively rotatable to provide valving action, said valve members including a first valve member having a plurality of through apertures for respective communication with said vessels, and a second valve member including a pair of separate flow passage means for selectively and separately interconnecting first and second variably paired combinations of said apertures through said first valve member in order to enable separate fluid flow between each said aperture pair; drive means for driving continuous relative rotation of said valve members in order to enable rotationally cycled, variable interconnection and fluid flow through said aperture pairs.

* * * * *

UNITED STATES PATENT AND TRADEMARK OFFICE
CERTIFICATE OF CORRECTION

PATENT NO. : 4,925,464

DATED : May 15, 1990

INVENTOR(S) : Richard Rabenau, Rowland Kanner and Donald W. Hunter

It is certified that error appears in the above-identified patent and that said Letters Patent is hereby corrected as shown below:

On the title page item [57]:

In the Abstract "for further oxygen separtaion", it should be
-- for further oxygen separation,--

Column 2, Line 43

"view of an abutment" it should be -- view of an embodiment --

Signed and Sealed this

Fourteenth Day of July, 1992

Attest:

DOUGLAS B. COMER

*Attesting Officer*    *Acting Commissioner of Patents and Trademarks*